(No Model.)

H. C. BOYER.
REGISTER FOR CAMERA ROLL HOLDERS.

No. 460,672. Patented Oct. 6, 1891.

WITNESSES: INVENTOR

Henry C. Boyer.

UNITED STATES PATENT OFFICE.

HENRY C. BOYER, OF PHILADELPHIA, PENNSYLVANIA.

REGISTER FOR CAMERA ROLL-HOLDERS.

SPECIFICATION forming part of Letters Patent No. 460,672, dated October 6, 1891.

Application filed March 17, 1891. Serial No. 385,437. (No model.)

*To all whom it may concern:*

Be it known that I, HENRY C. BOYER, a citizen of the United States, residing at the city of Philadelphia, in the county of Philadelphia and State of Pennsylvania, have invented a new and useful Register for Camera Roll-Holders, of which the following is a specification.

My invention relates to improvements in photographic camera roll-holders in which a strip of sensitized film or paper is transferred from one rotary part to another upon each exposure to the light.

The object of my improvement is, first, to provide a registration of the number of sections of sensitive film with which a camera may be charged at any time; second, to provide an automatic register of the number of exposed sections as the exposures are made; third, to provide an automatic register of the number of sensitive sections of film remaining until the whole are exposed. I attain these objects by the mechanism illustrated in the accompanying drawings, in which—

Figure 1:
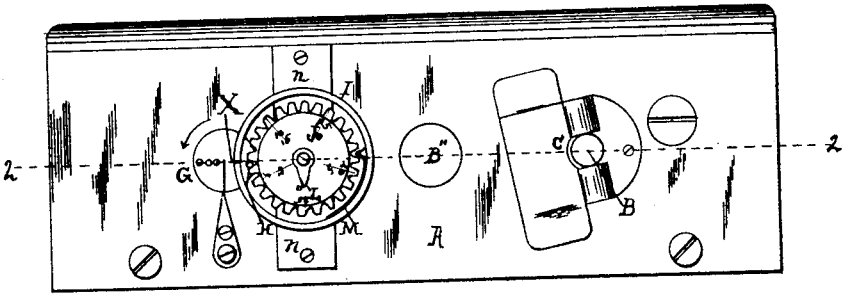
Figure 2:
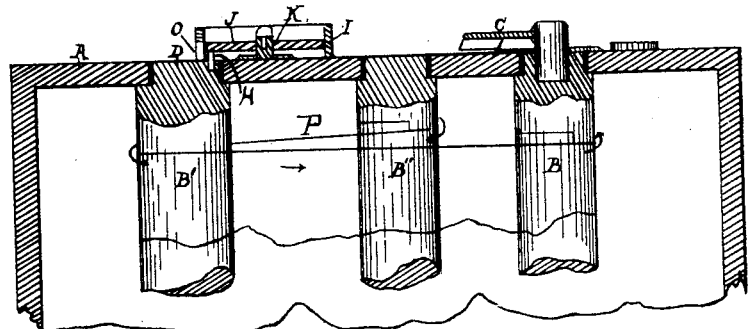
Figure 3:
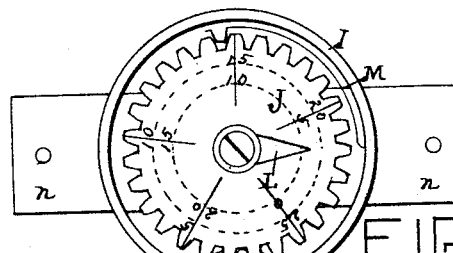
Figures 5, 6:
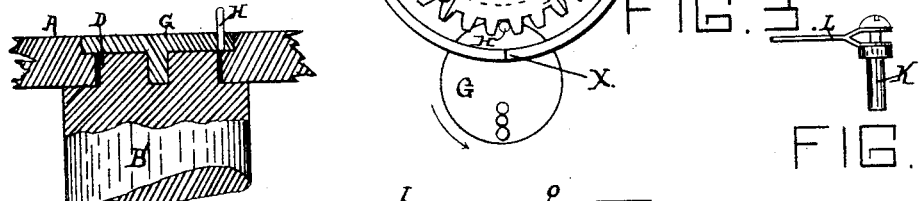
Figure 4:
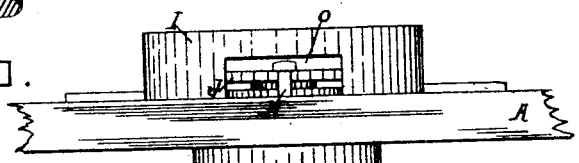

Figure 1 is a top view of a camera roll-holder and the registering device attached thereto. Fig. 2 is a vertical section of the roll-holder, the registering-wheel, and its connected parts upon the line 2 2, Fig. 1. Fig. 3 is a top view of the register together with the metal disk and stud attached to a bearing of the roller carrying the sensitive film. Fig. 4 is a side view of the registering-wheel and its connected parts inclosed within the case. Fig. 5 is a vertical section of a roller-bearing and a lug inserted in a disk covering the end of the bearing. Fig. 6 is a vertical section of the pointer and the wheel-shaft.

Similar letters refer to similar parts throughout the entire machine.

A represents a camera roll holder or case containing the rollers B B' B''. The roller B'' carries the strip of unexposed film P, the strip varying in length with the size of the camera and the number of negatives it is desired to produce. This strip of film passes from the roller B'' around roller B' and in frictional contact with it, and thence to the roller B, to which it is attached. By turning the key C the roller B is revolved and sufficient film withdrawn from B'' equal in length to that of the negative desired. In this operation the roller B' is caused to revolve, its circumference being equal to the length of the film required for a single negative.

The roller B' has immovably affixed to it a bearing D, inserted in a suitable light-tight collar attached to the roll-holder A, the exterior sectional surface of the bearing being exposed. To this bearing is attached a small metal disk G, so that its exterior surface is upon a plane with the outer surface of the roll-holder this disk revolving with the bearing D. In the disk G is screwed or fitted a small lug or pin H, its diameter slightly less than the distance between any two adjacent teeth of the wheel J. The lug may be fastened directly to the shaft, as shown in Fig. 2; but I prefer using the disk G, as shown in Fig. 5. This disk is perforated with one or more holes, the position of said holes depending upon any desired radius within the radius of the disk. In one of these holes is inserted the lug H. The object of these holes is to permit the same disk, as well as the other parts, to be used upon cameras of different size and capacity merely by interchanging wheels with different numbers of teeth. Thus in a camera with a capacity of, say, fifty negatives it would be convenient to use a wheel with fifty teeth; but in a camera with one hundred negative capacity such a wheel would make two revolutions in registering the total number of continuous exposures, and would therefore not register exactly without allowance. By substituting in such case a wheel with one hundred teeth and shifting the lug to a hole nearer the center of the disk, and then shifting the position of the plate and the screws n n, and then attaching the plate so that the lug H will engage and disengage with the teeth of the wheel, the same parts, with the exception noted, can be used upon cameras of different capacity, the correct position of these wheels being ascertained either by calculation or experiment.

While a wheel with a number of teeth suitable for a camera of the greatest film capacity might be used in all cases, yet it is evident that the finer the teeth and the smaller, therefore, the lug, the greater is the risk of accidental injury to them both and of inaccuracy in registering. My arrangement permits the interchanging of wheels most suitable for particular cameras.

I represents a metal case open at the top, inclosing within it a toothed wheel J, revolving upon a shaft K with a shouldered head, this shaft being attached to and supported by the base of the case L. Upon the top of the shaft K is attached a pointer L by a screw serving as a pivot for this pointer, which turns so as to indicate any number of the outer row and remains fixed in that position. This pointer may have a bifurcated spring-bearing, as shown in Fig. 6, or the shaft K may be hollow and the pointer L be rigidly connected with a shaft slit longitudinally and sprung into the hollow portion of shaft K and the pointer so held in place, or it may be mounted upon a screw with a milled head. The teeth of the wheel J are numbered from 1 to a given number, say 25, by an outward row of numerals, say with No. 1 uppermost, reading from left to right, and are also numbered by an inner row or circle reading in the contrary direction, so that the sum of the numbers of any one tooth make an equal total, with the exception of one tooth having the two highest numbers. The series of numbers perform this function. When a wheel is used having a number of teeth equal to the film-exposing capacity of the camera to which it is applied, as the teeth pass the index-point X an opposite number of the outer row indicates the number of films remaining unexposed. The number beneath of the inner row indicates the number of exposures made. The sum of these numbers indicates the full capacity of the camera, and the number of films with which exposures were begun. In a given camera loaded to its full capacity, it is desirable that the number of teeth of the wheel shall correspond with the full negative capacity, and in such case the respective series of numbers as thus rotated would indicate the total number of negatives taken and remaining. In such case the pointer is turned to the zero-mark of the inner row; but it is constantly required to cut off a number of the exposed films to develop them before the remaining films are exposed, and in such case it is desirable to keep a record of the number of films with which the camera was loaded at the beginning of the second series of exposures, and as well constantly to know the number of films left unexposed. With a wheel with but one row of numbers—such as the outer row—by turning the wheel until the number corresponding with the remaining number of unexposed films is brought to the index-point X, the wheel therefore will register the number of films remaining after each subsequent exposure; but this would not register the total number of films unexposed at the beginning of the second series of exposures, for even though started with that number opposite the index-point, as the wheel revolves the number with which the second series of exposures began could not be identified, and under such circumstances the inner row would not register the number of films exposed, but always a greater number than the actual number at the beginning of the second series of exposures, and therefore it could not be told how many exposures had been taken in the second series, although the number of films remaining to be exposed would be registered. To overcome this deficiency, I use a pointer L, as follows: When the second series of exposures is begun and the strip of unexposed film is less than the highest number of the wheel, I subtract the number of exposed films which have been cut off from the number composing the original strip of film and turn the wheel until the number of the remaining films is brought opposite the index-point. The pointer is then turned so that it points to the zero-mark. As the film is exposed, it is evident that the outer row will register the number of remaining films, and the number of the inner row opposite the pointer will register the number of films exposed, and the sum of these numbers will indicate the number of films at the second series of exposures.

M is a spring-detent, one end attached to the side of the case L and the other end engaging with the teeth of the wheel J.

The case I has suitable projections or shoulders having screw-holes and screws n n, and by which or by other means it can be attached to the camera roll-holder. O is an aperture or longitudinal opening in the lower side of the case I, its length equivalent to the radial sweep of the lug H within it when rotated.

The case I with its inclosed parts is placed in a position upon the roll-holder, so that the lug H may in rotating pass within the case I through the aperture O, and there successively engage at each revolution with the teeth of the wheel J tooth by tooth. In this position the case I is then suitably fastened to the roll-holder.

I will now describe the mode of operating my device. The camera being loaded with a strip of film sufficient for any number of negatives—say less than twenty-six—the wheel J is moved so as to bring the lug H in contact with No. 25 tooth, but between No. 1 and No. 25 of the outer row, after which the key C is then turned, so that the roller B', with its attached disk G, makes a complete revolution, when tooth No. 25 will be engaged by the lug, signifying twenty-five plates for exposure. As exposures are made and fresh plates brought in place, the lug will be brought into engagement with each successive tooth, whose outer number will indicate the number of plates remaining. The number immediately beneath it will indicate the number of exposures made. The wheel J is prevented from accidental moving and held in its proper position after the lug passes from engagement with its teeth by the detent M. Before turning the key C, the pointer L is moved so that it points to the 0 (zero) number of the inner row of numerals corresponding to the number of negatives contained in the roll of film upon the roller. Each revolution of the lug H will then cause a number one less than the preceding number successively to be brought opposite the pointer, the lug being returned within the case, where it is there protected, and the registering-wheel locked until again caused to revolve. The inner row will thus register the number of exposures by the number of the tooth which last engaged the stud, the number of the outer row upon the same tooth will denote the number of remaining negatives, and the original number of negatives at the beginning of the computation will be shown by adding to the number of the inner row beneath the pointer the number of the outer row of the tooth last freed from engagement with the stud. The point where this disengagement occurs may be marked upon the case and used as an index-mark.

In a holder containing more than twenty-five negatives with a registering-wheel of twenty-five teeth, a given number may be taken and a memorandum made, and the wheel turned back to the starting-point, or the wheel J may be made with a greater number of teeth, the advantage of my device being apparent from the fact that in the latter case, by changing the wheel J and the position of the case I and simply altering the position of the lug H upon disk G, so that it describes a circle with a shorter radius, the machine can be adapted to the exposing capacity of any roll-holder with little trouble or expense and with much economy of space and mechanism. Of course the method of numbering may be reversed and the pointer directed to the outer row of numbers.

What I claim as new, and desire to secure by Letters Patent, is—

1. In a roll-holder for photographic films, the combination of a toothed wheel with numbered teeth, a roller, a bearing for the roller, a pin or stud inserted therein revolving with the bearing, said pin engaging with said toothed wheel, a detent for said wheel, a metal case inclosing the toothed wheel and protecting it and also protecting the pin after completing its revolution, an aperture in said case, and a bearing for said wheel, all substantially as described, and for the purposes set forth.

2. In a roll-holder for photographic films, the combination of a toothed wheel, a roller, an exposed disk attached to a bearing on said roller, said disk perforated with one or more holes, the position of said holes depending upon any desired radius within the radius of the disk, a stud inserted in one of said holes engaging with said wheel, a shaft for said wheel, a spring-detent engaging with the teeth of said wheel, a pointer upon said shaft to indicate a number upon either circle of numbers, a binding-screw passing through one end of said pointer and entering a hole in said shaft, the teeth of said wheel numbered by two rows of numbers, the highest number of one row and the 0 number of the other row being upon the same tooth, one row numbering the teeth from right to left and the other row numbering them from left to right, all substantially as described, and for the purposes set forth.

3. In a roll-holder for photographic films, the combination of a roller, an exposed disk attached to a bearing of said roller, one or more holes in said disk at determined distances from its center, a metal stud having a base fitting any of said holes, a toothed wheel, a series of numbers consecutively numbering the teeth of said wheel from left to right, a series of numbers numbering the teeth of said wheel from right to left, the highest number of each series being upon the same tooth, a bearing for said wheel, a detent engaging with the teeth of said wheel, a pointer, a pointer-shaft, a metal case inclosing said toothed wheel, substantially as described, and for the purposes set forth.

4. In a roll-holder for photographic films, the combination of a roller, a roller bearing an adjustable revolving stud thereon, a toothed wheel, a case for said wheel, and an aperture in said case, substantially as described, and for the purposes set forth.

5. In a roll-holder for photographic films, the combination of an interior roller, an exposed bearing of the roller, a toothed wheel, holes in said bearing at different distances from its center, a movable stud fitting either hole, a detent, a pointer, a case for said wheel, an aperture in said case, and the teeth of said wheel numbered by two rows of numbers, the highest number of one row and the 0 number of the other row being on the same tooth, one row numbering the teeth from left to right and the other from right to left, all substantially as described, and for the purposes set forth.

HENRY C. BOYER.

Witnesses:
 JOS. M. DOHAR,
 L. M. SEHMAN.